Patented Nov. 16, 1926.

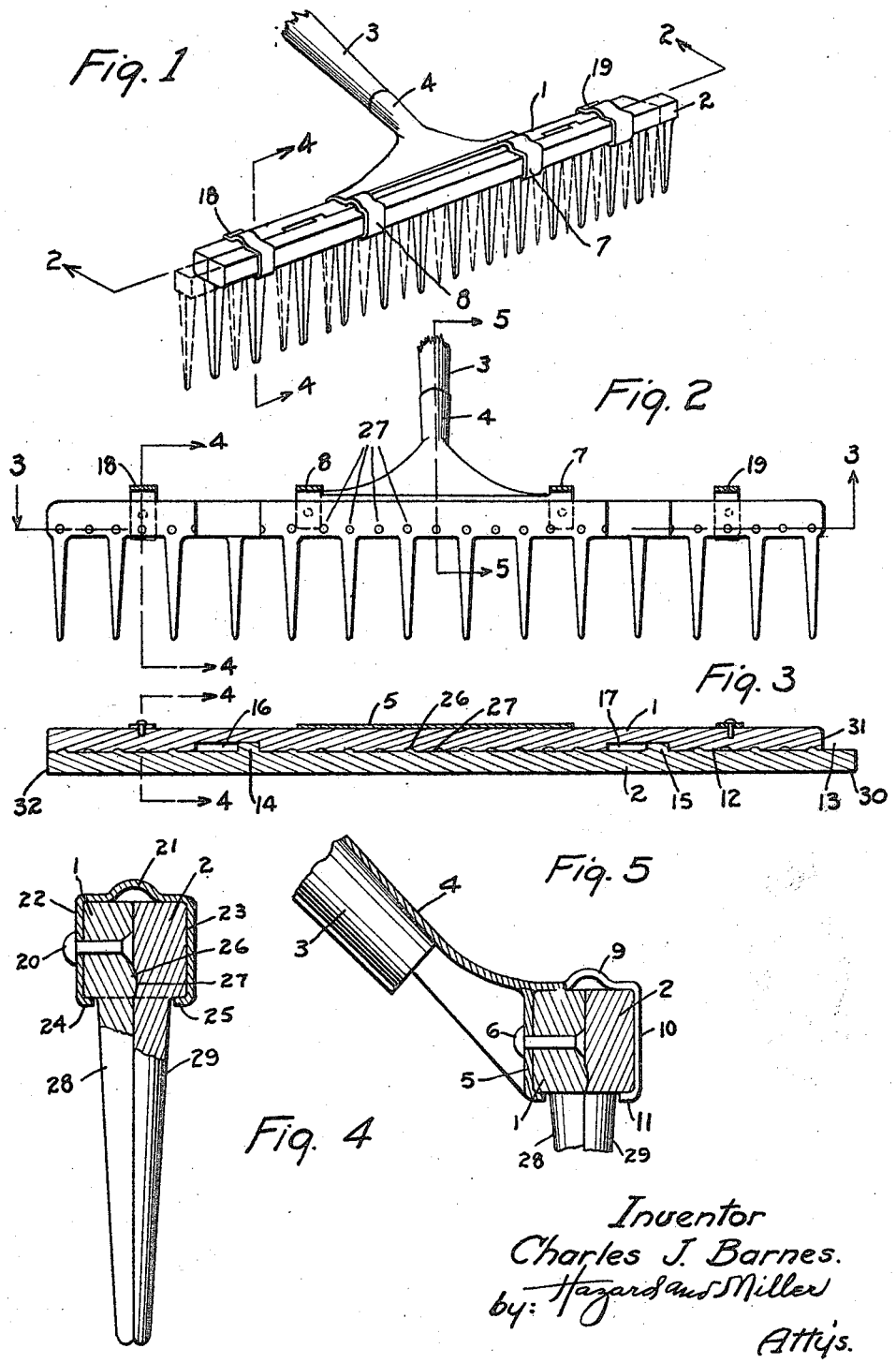

1,607,037

UNITED STATES PATENT OFFICE.

CHARLES J. BARNES, OF REDLANDS, CALIFORNIA.

DUPLEX RAKE.

Application filed April 13, 1925. Serial No. 22,829.

This invention is a duplex rake and consists of the novel features herein shown, described and claimed.

An object is to make a rake that is readily transformable from a coarse rake to a fine rake and vice versa.

Other objects and advantages will appear from the drawings and specification. The drawings illustrate the invention.

Figure 1 is a perspective of a duplex rake embodying the principles of my invention.

Fig. 2 is a vertical longitudinal section on the line 2—2 of Fig. 1.

Fig. 3 is a horizontal longitudinal section on the line 3—3 of Fig. 2.

Fig. 4 is a vertical cross section on the lines 4—4 of Figs. 1, 2 and 3.

Fig. 5 is a fragmentary vertical cross section on the line 5—5 of Fig. 2.

The details of construction and operation are as follows:

The duplex rake head consists of the rigid bar 1 and the sliding bar 2. The handle 3 has a ferrule 4 formed integral with an attaching plate 5 and the attaching plate 5 extends some distance along the rigid bar 1 at the outer side and at the top and is secured to the bar 1 by rivets 6.

Bearing arms 7 and 8 extend from the ends of the attaching plate 5 over the bar 2 and downwardly and under the bar, each arm 7 and 8 comprising an upper portion 9 extending across the top of the bar 2, an outer portion 10 extending downwardly along the outer face of the bar 2 and the return portion 11 extending backwardly under the bar 2. The bars 1 and 2 fit together and have meeting faces 12 and 13 and the bar 2 has tongues 14 and 15 extending into recesses 16 and 17 of the bar 1 to form a stop mechanism to limit the movement of the bars longitudinally relative to each other.

Of course, the arrangement of the tongues and grooves could be reversed. Secondary bearings 18 and 19 have corresponding ends secured to the bar 1 by rivets 20, each of said bearings comprising a central portion 21 extending across the tops of the bars 1 and 2, side portions 22 and 23 extending down the outer side of the bars 1 and 2 and return portions 24 and 25 extending inwardly under the bars 1 and 2.

The bar 1 has slight recesses 26 and the bar 2 has corresponding nubs 27 registering with the recesses 26 and properly spaced so that when the bars move in transforming the rake, the nubs 27 jump from one recess to the next, and when the bars move the other way the nubs jump back, the bearings 7, 8, 18 and 19 are sufficiently elastic to allow of this operation. The bearings 18 and 19 are located near the ends of the bars 1 and 2.

Half round teeth 28 extend from the bar 1 and are evenly spaced apart and corresponding half round teeth 29 extend from the bar 2. When the bar 2 is moved to the left in Fig. 1 as shown in dotted lines the teeth 28 and 29 match, each matched pair of teeth serving to form one tooth of a coarse rake and when the bar 2 is moved to the left as shown in dotted lines the teeth of the bar 2 come between the teeth of the bar 1 and form a fine tooth rake.

The bar 2 is slightly longer than the bar 1 so that when the parts are made up as a coarse rake there is a projecting end 30 at the right as seen in Figs. 1 and 3, and when it is desired to make a fine tooth rake this end 30 is moved into a position flush with the end face 31 of the bar 1 and the opposite end 32 of the bar 2 projects as shown in dotted lines in Fig. 1. The parts fit reasonably close and it is only necessary to drive the bar 2 one way or the other to make the transformation from a coarse rake to a fine rake or from a fine rake to a coarse rake.

The bars 1 and 2 and the teeth 28 and 29 may be steel castings and if the castings are well made will require only a small amount of finishing work.

The rake is instantly transformable by grasping the handle 3, turning the head to a vertical position and striking the end 30 upon anything hard to make the fine rake or striking the end 32 to make the coarse rake.

Various changes may be made without departing from the spirit of my invention as claimed.

I claim:

A duplex rake comprising in combination a fixed rake bar having a series of teeth, a handle having a fastening means connected thereto, a sliding rake bar positioned against the fixed bar and having a series of teeth, a plurality of bearing arms operatively connected to the fixed bar, extending over and slightly under the sliding bar, said bearing arms being resilient, the fixed bar having recesses and the sliding bar having tongues extending therein to limit the sliding movement, whereby the teeth on the sliding bar may be spaced intermediate of the teeth on the fixed bar.

In testimony whereof I have signed my name to this specification.

CHARLES J. BARNES.